United States Patent
Müller et al.

(10) Patent No.: US 8,634,851 B2
(45) Date of Patent: Jan. 21, 2014

(54) SENSORS FOR AN AIRCRAFT FOR LOCATING DEVICES

(75) Inventors: Jan Müller, Hamburg (DE); Daniel Glaser, Hamburg (DE); Uwe Schwark, Ottersberg (DE)

(73) Assignee: Airbus Operations GmbH (DE)

( * ) Notice: Subject to any disclaimer, the term of this patent is extended or adjusted under 35 U.S.C. 154(b) by 0 days.

(21) Appl. No.: 13/201,733

(22) PCT Filed: Feb. 9, 2010

(86) PCT No.: PCT/EP2010/051545
§ 371 (c)(1),
(2), (4) Date: Aug. 16, 2011

(87) PCT Pub. No.: WO2010/092037
PCT Pub. Date: Aug. 19, 2010

(65) Prior Publication Data
US 2011/0300880 A1    Dec. 8, 2011

Related U.S. Application Data

(60) Provisional application No. 61/153,053, filed on Feb. 17, 2009.

(30) Foreign Application Priority Data

Feb. 16, 2009 (DE) .......................... 10 2009 009 188

(51) Int. Cl.
*H04W 24/00* (2009.01)

(52) U.S. Cl.
USPC .................. 455/456.1; 455/456.2; 340/12.51; 340/12.52; 340/13.26; 340/13.28

(58) Field of Classification Search
USPC .................. 455/456.1–456.6, 418–420, 431, 455/67.11–67.14, 115.1–115.4, 226.1–227, 455/3.01–3.05; 340/12.51–12.54, 340/13.26–13.3, 541
See application file for complete search history.

(56) References Cited

U.S. PATENT DOCUMENTS

| | | |
|---|---|---|
| 6,587,188 B2 | 7/2003 | Gleine et al. |
| 7,042,867 B2 | 5/2006 | Whitehill et al. |
| 7,457,860 B2 | 11/2008 | Shang et al. |
| 2001/0026362 A1 | 10/2001 | Gleine et al. |
| 2004/0077308 A1 | 4/2004 | Sanford et al. |
| 2004/0203380 A1 | 10/2004 | Hamdi et al. |
| 2004/0203904 A1 | 10/2004 | Gwon et al. |
| 2005/0061914 A1 | 3/2005 | Bishop et al. |
| 2005/0143101 A1 | 6/2005 | Kyperountas et al. |
| 2006/0267731 A1* | 11/2006 | Chen ........................ 340/10.1 |

(Continued)

FOREIGN PATENT DOCUMENTS

| | | |
|---|---|---|
| CN | 101238384 A | 8/2008 |
| DE | 10004384 A1 | 8/2001 |

(Continued)

*Primary Examiner* — Chuong A Ngo
(74) *Attorney, Agent, or Firm* — Lerner, David, Littenberg, Krumholz & Mentlik, LLP

(57) ABSTRACT

The invention relates to a sensor network for determining the position of devices and gear in an aircraft. The sensor network exhibits several sensor nodes, which have an autonomous power supply. The sensor nodes can communicate wirelessly with each other and with a central processing unit. The position of each individual sensor node can be determined by evaluating high-frequency signal parameters.

11 Claims, 3 Drawing Sheets

(56) References Cited

U.S. PATENT DOCUMENTS

| | | |
|---|---|---|
| 2007/0042706 A1 | 2/2007 | Ledeczi et al. |
| 2007/0213009 A1 | 9/2007 | Higashida et al. |
| 2008/0094212 A1* | 4/2008 | Breed .......................... 340/541 |
| 2008/0163670 A1 | 7/2008 | Georgeson |
| 2008/0268873 A1 | 10/2008 | Wymeersch et al. |
| 2009/0243895 A1 | 10/2009 | Mitchell et al. |
| 2009/0300379 A1 | 12/2009 | Mian et al. |
| 2010/0012780 A1 | 1/2010 | Kohlmeier-Beckmann et al. |

FOREIGN PATENT DOCUMENTS

| | | |
|---|---|---|
| DE | 102006006719 A1 | 8/2007 |
| DE | 102006006720 A1 | 8/2007 |
| DE | 102008033733 A1 | 1/2010 |
| JP | 2003077085 A | 3/2003 |
| WO | 0158730 A1 | 8/2001 |
| WO | 2007006085 A1 | 1/2007 |
| WO | 2010092037 A1 | 8/2010 |

* cited by examiner

SENSORS FOR AN AIRCRAFT FOR LOCATING DEVICES

CROSS-REFERENCE TO RELATED APPLICATIONS

This application is a national phase entry under 35 U.S.C. §371 of International Application No. PCT/EP2010/051545, filed Feb. 9, 2010, published in German, which claims the benefit of the filing date of German Patent Application No. 10 2009 009 188.2, filed Feb. 16, 2009 and of U.S. Provisional Patent Application No. 61/153,053 filed Feb. 17, 2009, the entire disclosures of which are hereby incorporated herein by reference.

FIELD OF THE INVENTION

The invention relates to localizing devices and pieces of equipment in an aircraft. In particular, the invention relates to a sensor node for a sensor network in an aircraft, a sensor network with several sensor nodes, an aircraft with a sensor network, as well as a method for determining a local arrangement of several sensor nodes in an aircraft.

TECHNOLOGICAL BACKGROUND

The installation site of devices and components in an aircraft is typically described in the corresponding documentation. If a device is installed at another location, the documentation has to be changed. An automatic, site-dependent configuration of the device is not possible.

To improve and accelerate the preventative maintenance sequence for the aircraft, it is desirable to know the state of all relevant system components and fixtures, in particular their installation site.

Sensors in aircraft are used to detect physical measuring variables, with which conclusions can be drawn about the state of an aircraft system component, etc. Typical sensors of this kind are hooked up to a power supply and evaluator by means of corresponding electrical lines. In light of weight restrictions in aircraft construction along with the complexity of necessary electrical cabling for a sensor network, sensors are currently used only very sparingly, and just in places where essential.

DE 100 04 384 A1 and U.S. Pat. No. 6,587,188 B2 describe sensor arrangements for acquiring temperatures. The sensor exhibits an optical fiber, with which stresses in the material can be detected. Such sensors cannot be installed at all locations within an aircraft.

SUMMARY OF THE INVENTION

One object of the invention is to provide a way to automatically localize devices and fixtures in an aircraft.

Indicated herein are sensor nodes for a sensor network in an aircraft, a sensor network for determining a local arrangement of several sensor nodes, an aircraft with a sensor network and a method for determining a local arrangement of several sensor nodes in an aircraft according to the features in the independent claims. Further developments of the invention may be gleaned from the subclaims.

The described exemplary embodiments apply equally to the sensor nodes, the sensor network, the aircraft and the method. In other words, the features mentioned below, for example in relation to the sensor nodes, can also be implemented as procedural steps, and vice versa.

An exemplary embodiment of the invention indicates a sensor node for a sensor network in an aircraft, for example one that involves a passenger aircraft. The sensor node exhibits a sensor unit and communications unit. The sensor unit is used to acquire a parameter based upon which the position of the sensor node within the sensor network can be determined. In particular, the sensor position can be determined by suitably transmitting the measured value and simultaneously observing this transmission from several observation sites (other sensors). The communications device is used to transmit data based on the acquired parameters. The data are transmitted to a central processing unit.

Data are transmitted wirelessly using a suitable radio communications technology. Examples for the above include Bluetooth, WLAN, Zigbee or WiMax. Communication links via WLAN (802.11a/b/g/n or WLAN 82.11p) or UWB can also be used. However, use can also be made of another radio communications technology.

Hence, the sensor node enables a wireless connection to a central processing unit on the one hand, and a localization function combined therewith on the other.

For example, the localization of the sensor node (localization function) can be enabled by having the sensor node record signal parameters from adjacent sensor nodes, evaluate the latter as needed, and then relay corresponding data to the central processing unit. The central processing unit can calculate the relative positions of the individual sensor nodes to each other based on these parameters. If the central processing unit has a priori knowledge of the position of at least one sensor node in absolute form, the absolute positions of all sensor nodes can be ascertained. How accurately the positions are determined depends heavily on how precisely the measured signal parameter images the geometric distances between the sensor nodes. The accuracy of localization can also be improved by incorporating additional deductively known information. For example, the localization function can be told how the installation sites for the sensors are distributed within the monitored area. As a consequence, the localization function can use knowledge about the neighborhood conditions and more precisely estimate the position.

In another exemplary embodiment of the invention, the parameter acquired by the sensor unit of the sensor node is a high-frequency signal parameter.

Several such high-frequency signal parameters can also be acquired. For example, this can involve a transmission power, transmission signal transit time and/or a transmission frequency.

Let it be noted at this juncture that the acquired parameters within the sensor node do not have to be evaluated in advance. The entire evaluation can also take place in the central processing unit.

In another exemplary embodiment of the invention, the sensor unit is further configured for acquiring (another) measured value, for example a temperature, vibration, acceleration, expansion or pressure.

Given a correspondingly designed sensor node, several such measured values can also be acquired in a sensor node (e.g., pressure and temperature).

In this way, then, the central processing unit not only receives data based on which the position of the individual sensor nodes can be determined, but also additional environmental data making it possible to draw conclusions about the state in the area of the corresponding sensor node (e.g., the operating state or present configuration of a corresponding system component).

In another exemplary embodiment of the invention, the sensor node further exhibits a power supply unit for supplying the sensor node with electrical energy. The power supply unit is here configured to autonomously supply power to the sensor node through energy conversion.

In this way, the sensor node can be operated independently of an external power supply. This makes it possible to do without electrical lines.

In another exemplary embodiment of the invention, the power supply unit exhibits a vibration generator and/or a thermoelectric converter and/or an antenna to receive electrical energy and/or a photovoltaic unit or solar cell to convert light into electrical energy for providing the sensor node with a decentralized power supply.

The thermoelectric converter utilizes a temperature gradient, for example that arises between the inside of the aircraft and the outside of the aircraft, so as to obtain electrical energy from it.

A photovoltaic unit can be used to supply an entire array of sensors with energy by means of a light source that irradiates the different photovoltaic units.

No electrical lines are necessary for connecting the different sensor nodes here either.

Another exemplary embodiment of the invention indicates a sensor network for determining a local arrangement of several sensor nodes described above and below. The sensor network exhibits one (and as a general rule several, of course) sensor node. Also provided is a central processing unit for receiving the data transmitted by the sensor node and determining the position of the sensor node based on the transmitted data.

Data transmission is wireless.

This makes it possible to change the locations of the different sensor nodes inside or outside the aircraft. Since the sensor nodes are integrated into a communications network (sensor network), their relative or even absolute positions can be easily determined.

In another exemplary embodiment of the invention, the position of the sensor node (or sensor nodes) is determined based on a correlation of data received from several sensor nodes.

Even though every single sensor node does not know its own position at the start of the procedure, communication between the individual sensor nodes involving a very low information density is enough to determine the position of the sensor nodes.

In another exemplary embodiment of the invention, the sensor network is designed to determine the position of seats in the cabin of the aircraft. To this end, the individual sensor nodes are integrated into or secured upon the corresponding seats, for example.

In another exemplary embodiment of the invention, the central processing unit is designed to determine the position of the seats and subsequent transmission of corresponding position information to the individual sensor nodes, whereupon the seats can be automatically configured.

The seats are configured depending on their position in the aircraft. Since the seat position is determined automatically, configuration can take place automatically as well.

In another exemplary embodiment of the invention, the sensor network further exhibits a permanently installed sensor node whose absolute position in the aircraft is known, so that this sensor node can serve as a fixed reference point.

In this way, the position of the individual sensor nodes can be determined more easily, and the positions can be ascertained in an absolute form.

Another exemplary embodiment of the invention indicates an aircraft with a sensor network described above and below.

Another exemplary embodiment of the invention indicates a method for determining a local arrangement of several sensor nodes in an aircraft, in which a parameter is ascertained, based upon which the position of a sensor node within a sensor network can be determined. This is followed by a transfer of data based on the acquired parameters to the central processing unit. The position of the sensor node is then determined based on the transmitted data.

Exemplary embodiments of the invention will be described below with reference to the figures.

DETAILED DESCRIPTION OF EXEMPLARY EMBODIMENTS

The depictions on the figures are schematic and not to scale.

The following description of figures uses the same reference numbers for identical or similar elements.

Figure 1:
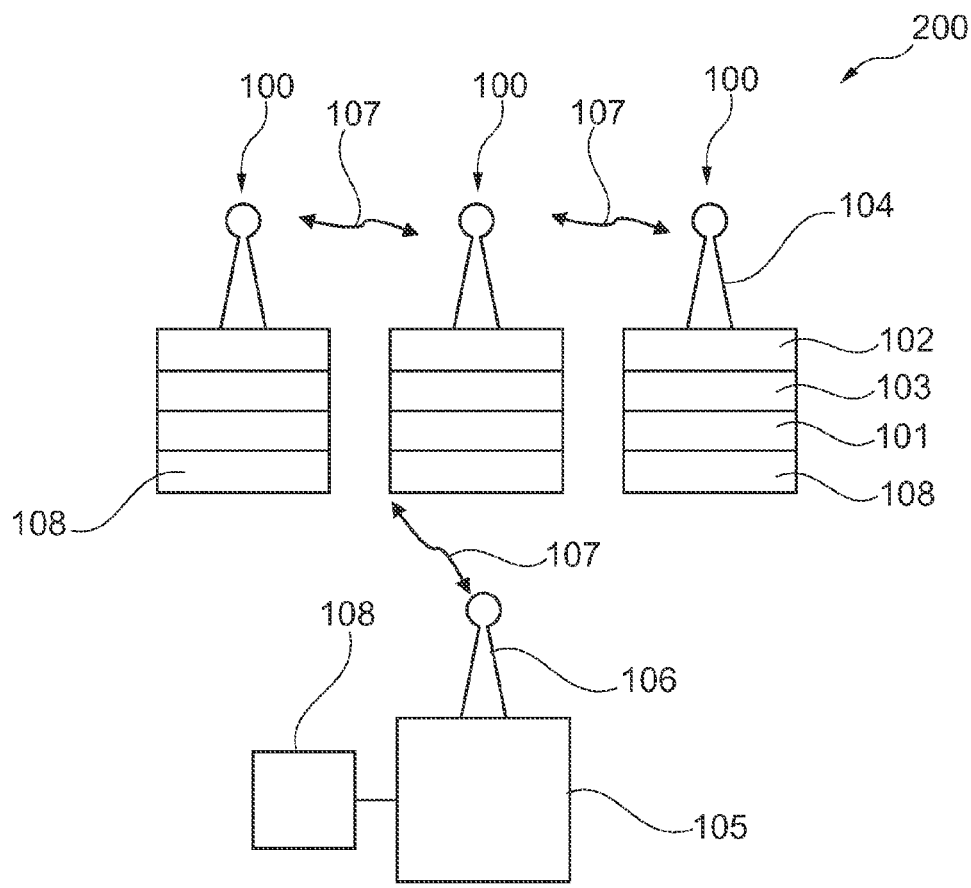
FIG. 1 shows a sensor network according to an exemplary embodiment of the invention.

FIG. 1 shows a sensor network 200 with several sensor nodes 100 and a central processing unit 105. Of course, additional sensor nodes 100 can be provided.

For example, each sensor node exhibits a sensor unit 101 for acquiring a parameter, based upon which the position of the sensor node within the sensor network can be determined. In addition, each sensor node exhibits a communications unit 102 for transmitting data to the central processing unit 105, as well as for receiving data from the central processing unit 105. A power supply unit 103 can also be provided, which ensures an autonomous power supply to the corresponding sensor node. Further provided is an antenna 104, which can be used for communication purposes. The individual sensor nodes 100 can also communicate with each other. This is symbolized by the arrows 107.

In addition, each sensor node can exhibit its own processor 108, for example which can subject received signals to a preliminary evaluation.

The central processing unit 105 also exhibits an antenna 106.

One characteristic feature of the sensor nodes 100 in addition to or exclusive of the normal sensor function (e.g., measuring a temperature or pressure) is that they can measure high-frequency signal parameters (HSP), and send these measured and, if necessary, preliminarily evaluated high-frequency signal parameters to the central processing unit 105. The high-frequency signal parameters can relate to the power, transit time and/or frequency of the corresponding high-frequency signal.

A database 108 of the central processing unit 105 can be filled with the measured values. Software can correlate all of these values to perform an evaluation to determine the location at which the sensor nodes are installed. This location can only be determined with limited precision as a function of the signal propagation conditions and used HSP, since the measured HSP is limited in how accurately it images the geometric distance between the corresponding sensor nodes. Additional information relating to the geometric relationships between the sensor nodes can be used to increase the probability of an exact localization.

One exemplary embodiment for the above involves the seats in the aircraft cabin. During construction of the aircraft, the seats (completely integrated, i.e., to include all components and sensors) are taken out of the warehouse and built into the aircraft. After the sensor network has been activated, each sensor node will deliver its measured high-frequency signal parameter data to the central processing unit 105. The central processing unit 105 then determines the absolute installation site for the corresponding sensor node. After this, the central processing unit 105 transmits the information about where the sensor node is located to the sensor node. All devices located in the seat can then be configured. This step marks the conclusion of the installation procedure, and all seat-specific functions can be used, e.g., reading lamp, passenger call ("PAX call"), entertainment equipment (IFE, inflight entertainment).

In order to improve the accuracy with which the position is determined even more, additional sensors whose absolute positions are always known can be integrated. As a result, there are always fixed reference points for measuring the HSPs.

Another example has to do with determining the presence of loose gear (e.g., life vests), wherein the seat sensors are used as an expanded reference signal source in this case.

In this instance, additional sensor nodes are built into the loose gear.

As a result, a wireless connection is established between and to the sensor nodes (also referred to as localization sensors) on and in the aircraft. These sensor nodes transmit their received high-frequency signal parameters to a central database. The relative position of all sensor nodes can be determined from this database via data correlation. This makes it possible to determine the position of devices (using the corresponding device identification numbers, IDs) and components to which the sensor node is attached, and enter it into a central aircraft database. Aircraft construction, maintenance and operation can be improved in this way.

Let it be noted at this juncture that the measured parameters can involve "waste products" from the normal communication between the individual sensor nodes or the sensor nodes and central processing unit. No further data transfer is required for recording the parameters. Rather, each sensor node picks up the normal communication, thereby acquiring the parameters needed for calculating the sensor node position.

Figure 2:
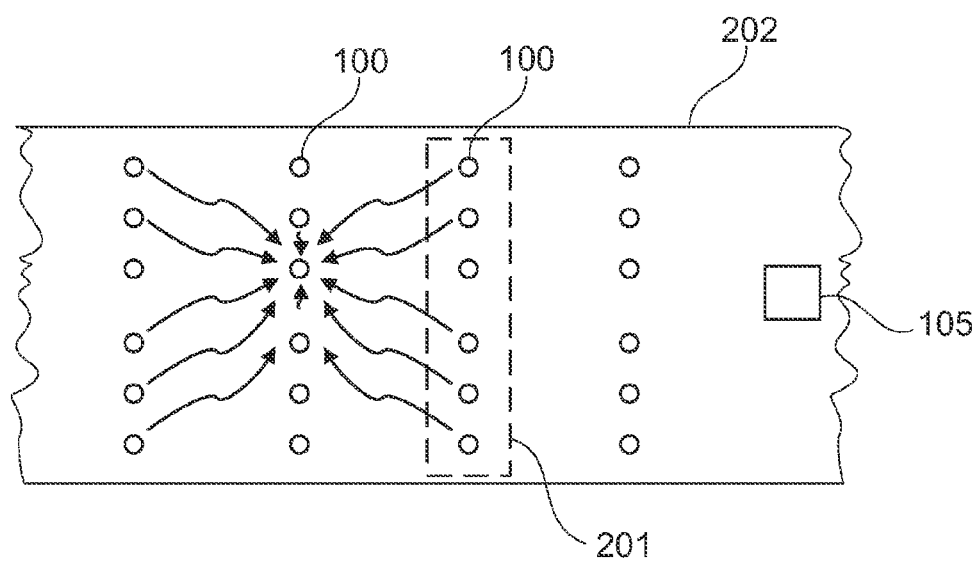
FIG. 2 shows a sensor network in a first operating state according to an exemplary embodiment of the invention.

FIG. 2 shows a sensor network 200 with a plurality of sensor nodes 100, which are designed as seat sensors, meaning built into the corresponding aircraft seats or secured thereto.

It must be borne in mind that the sensor network can also be used for determining the position of luggage items. An access point can here be provided in each baggage container, which gathers the data to be transmitted by the sensor nodes inside the container to the central processing unit and relays them to the processing unit.

Reference number 202 denotes the outer wall of the aircraft fuselage, while reference number 201 denotes a row of seats.

Each sensor node 100 can receive signals from the adjacent sensor nodes, evaluate these signals, if necessary in advance, and transmit the corresponding signals (which are either associated with the received signals or independent from them, associated only with the installation site of the sensor) to other sensor nodes or directly to the central processing unit 105.

FIG. 2 shows the step that can take place right after the sensor network has been activated, in which each sensor receives signals from its environment (from adjacent sensor nodes).

Figure 3:
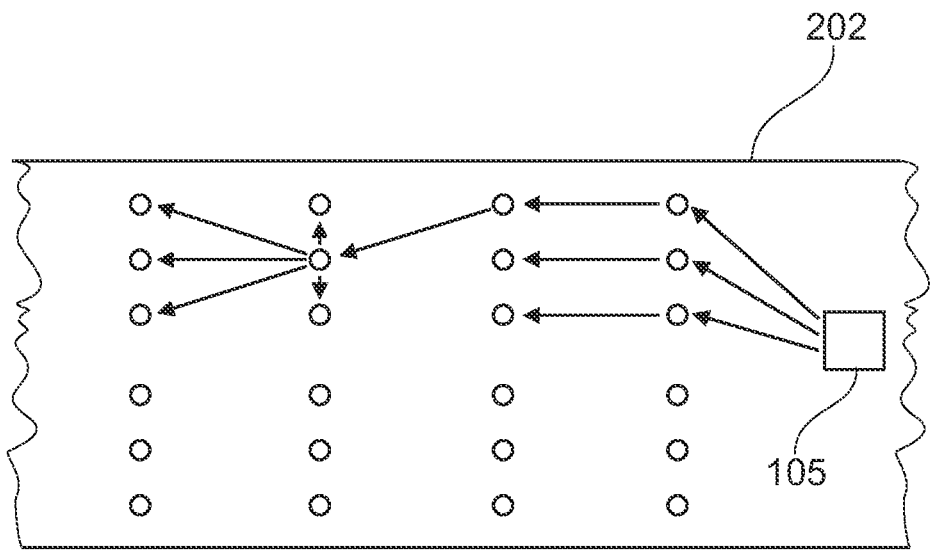
FIG. 3 shows the sensor network of FIG. 2 in a second operating state.

FIG. 3 shows another procedural step in which a corresponding location message is transmitted to each sensor node by the central processing unit 105. Transmission can take place either directly from the central processing unit 105 to the corresponding sensor node, or indirectly. Indirect transmission means that the location message is relayed by the central processing unit 105 from one sensor node to a next sensor node, until the information finally reaches the sensor node for which intended.

Figure 4:
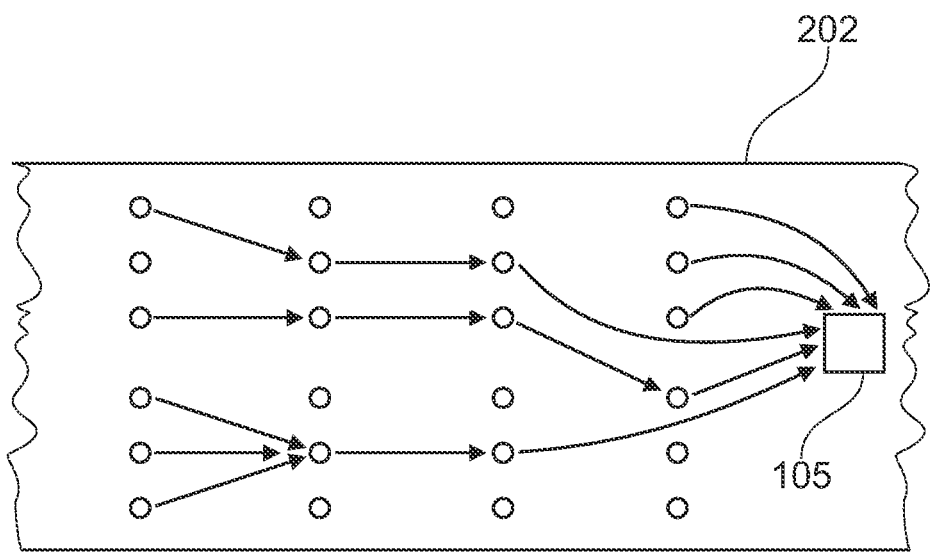
FIG. 4 shows the sensor network of FIG. 2 in a third operating state.

FIG. 4 shows another procedural step in which the HSP parameters are transmitted from the corresponding sensor node to the central processing unit 105. Transmission takes place either directly or indirectly (by interposing additional sensor nodes that pass along the information).

Figure 5:
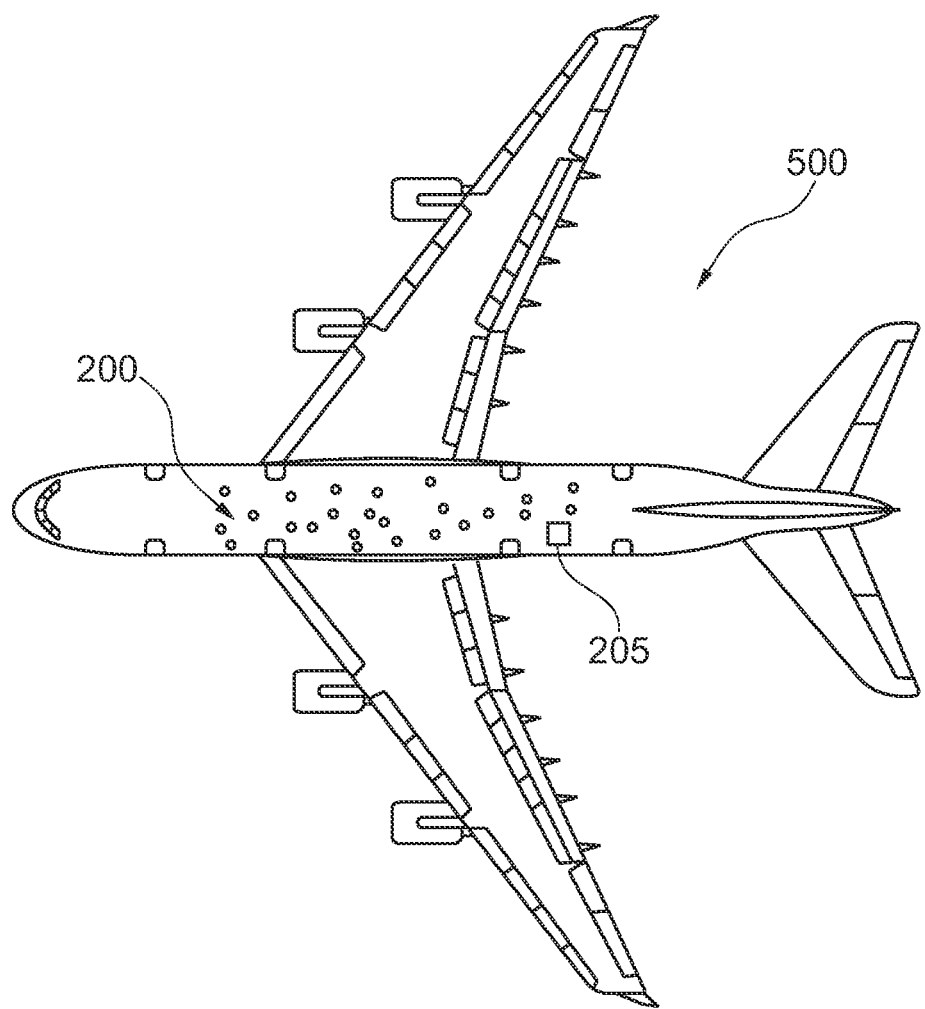
FIG. 5 shows an aircraft with a sensor network according to an exemplary embodiment of the invention.

FIG. 5 shows an aircraft 500 with a sensor network 200 according to the exemplary embodiment of the invention. The points in the fuselage denote the individual sensor nodes.

Figure 6:
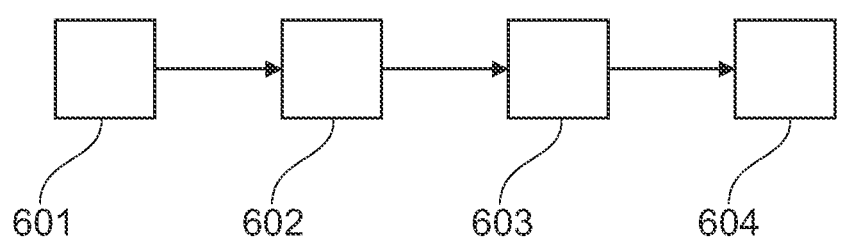
FIG. 6 shows a flowchart for a method according to an exemplary embodiment of the invention.

FIG. 6 shows a flowchart for a method according to an exemplary embodiment of the invention. In step 601, a high-frequency signal parameter is acquired by a sensor node. For example, this high-frequency parameter depends on which signals the sensor node has received from the sensor node adjacent to it. In step 602, the corresponding data based upon the acquired high-frequency signal parameters are then sent to the central processing unit. In step 603, the central processing unit determines the position of each individual sensor node based on the received data, while in step 604, the central processing unit transmits the corresponding position information to the individual sensor nodes.

In addition, it must be pointed out that "exhibit" or "comprise" or "encompass" do not preclude any other elements or steps, and that "a" or "the" do not rule out a plurality. Let it further be noted that features or steps described with reference to one of the above exemplary embodiments can also be used in combination with other features or steps from other exemplary embodiments described above. Reference numbers in the claims must not be construed as a limitation.

The invention claimed is:

1. A sensor network for determining a local arrangement of several sensor nodes, wherein the sensor network comprises:
   a plurality of sensor nodes, wherein each sensor node comprises:
   a sensor unit configured to acquire signal parameters from adjacent sensor nodes of the plurality of sensor nodes, based upon which signal parameters a position of the sensor node within the sensor network is determinable; and
   a communication unit configured to communicate with other sensor nodes of the plurality of sensor nodes and to transmit data based on the acquired signal parameters to a central processing unit,
   wherein the central processing unit is configured to receive the data transmitted by each of the plurality of sensor nodes and to determine relative positioning of each sensor node of the plurality of sensor nodes with respect to the other sensor nodes of the plurality of sensor nodes by correlating the transmitted data, and
   wherein the relative position of each of the plurality of sensor nodes is determined based on a correlation of data received from the several sensor nodes of the plurality of sensor nodes.

2. The sensor network of claim 1, wherein the sensor network is configured to determine the positions of seats in a cabin of an aircraft.

3. The sensor network of one claim 2, wherein the central processing unit is configured to determine the positions of the seats and subsequent transmission of corresponding position information, whereupon the seats are automatically configured.

4. The sensor network of claim 1, further comprising:
a permanently installed sensor node whose having a predetermined position relative to an aircraft, the predetermined position being a fixed reference point.

5. The sensor network of claim 1, wherein the parameter is a high-frequency signal parameter.

6. The sensor network of claim 1, wherein the sensor unit is further configured for acquiring a measured value selected from the group consisting of temperature, vibration, acceleration, expansion and pressure.

7. The sensor network of claim 1, further comprising:
a power supply unit for supplying the sensor node with electrical energy;
wherein the power supply unit is configured to autonomously supply power to the sensor node through energy conversion.

8. The sensor network of claim 7, wherein the power supply unit comprises a vibration generator, a thermoelectric converter, an antenna for receiving electromagnetic energy, or a photovoltaic unit for converting light into electrical energy.

9. The sensor network of claim 1, wherein a first sensor of the plurality of sensor nodes is configured to pass along information to a second sensor of the plurality of sensor nodes; and
wherein the second sensor is configured to pass along information to a third sensor node or to the central processing unit.

10. An aircraft with a sensor network for determining a local arrangement of several sensor nodes, wherein the sensor network comprises:
a plurality of sensor nodes, each sensor node comprising a sensor unit configured to acquire signal parameters from adjacent sensor nodes of the plurality of sensor nodes, based upon which signal parameters a position of the sensor node within the sensor network is determinable; and
a communication unit configured to communicate with other sensor nodes of the plurality of sensor nodes and to transmit data based on the acquired signal parameters to a central processing unit; and
a central processing unit designed to receive the data transmitted by each of the plurality of sensor nodes and to determine relative positioning of each sensor node of the plurality of sensor nodes with respect to the other sensor nodes of the plurality of sensor nodes by correlating the transmitted data,
wherein the relative position of each of the plurality of sensor nodes is determined based on a correlation of data received from the several sensor nodes of the plurality of sensor nodes.

11. A method for determining a local arrangement of several sensor nodes of a sensor network in an aircraft, wherein the method comprises the following steps:
acquiring signal parameters from adjacent sensor nodes of the several sensor nodes by each sensor node of the several sensor nodes based upon which signal parameters the position of each sensor node of the several sensor nodes within the sensor network is determinable;
communicating, by the sensor node of the several sensor nodes, with other sensor nodes of the several sensor noses and transmitting data based on the acquired parameter to a central processing unit; and
determining the relative position of each sensor node of the several sensor nodes with respect to the other sensor nodes of the plurality of sensor nodes by correlating the transmitted data received from the several sensor nodes.

* * * * *